(12) United States Patent  
Harish et al.

(10) Patent No.: US 7,743,667 B2  
(45) Date of Patent: Jun. 29, 2010

(54) CAPACITIVE DEVICE AND METHOD WITH AN ENHANCED MEASUREMENT ERROR CORRECTION CAPABILITY

(75) Inventors: Divyasimha Harish, Union City, CA (US); Jonathan T Lim, Fremont, CA (US); King Wong, Saratoga, CA (US); John Schultz, Santa Clara, CA (US)

(73) Assignee: Loadstar Sensors, Inc., Fremont, CA (US)

( * ) Notice: Subject to any disclaimer, the term of this patent is extended or adjusted under 35 U.S.C. 154(b) by 308 days.

(21) Appl. No.: 11/705,273

(22) Filed: Feb. 12, 2007

(65) Prior Publication Data

US 2008/0190210 A1    Aug. 14, 2008

(51) Int. Cl.
*G01B 7/16* (2006.01)
(52) U.S. Cl. .......................................... 73/780
(58) Field of Classification Search ................. 73/780
See application file for complete search history.

(56) References Cited

U.S. PATENT DOCUMENTS

| | | | |
|---|---|---|---|
| 4,093,915 A | 6/1978 | Briefer | |
| 5,225,959 A | 7/1993 | Stearns | |
| 5,633,594 A | 5/1997 | Okada | |
| 5,656,780 A * | 8/1997 | Park | 73/724 |
| 6,075,464 A | 6/2000 | Cloutier et al. | |
| 6,700,392 B2 | 3/2004 | Haase | |
| 7,343,814 B2 * | 3/2008 | Harish et al. | 73/780 |
| 7,353,713 B2 * | 4/2008 | Harish et al. | 73/780 |
| 7,451,659 B2 * | 11/2008 | Dallenbach et al. | 73/780 |
| 2006/0006883 A1 | 1/2006 | Foote et al. | |

* cited by examiner

*Primary Examiner*—Lisa M Caputo  
*Assistant Examiner*—Octavia Davis  
(74) *Attorney, Agent, or Firm*—Raj Abhyanker LLP

(57) ABSTRACT

A capacitive device and method with an enhanced measurement error correction capability is disclosed. In one embodiment, an apparatus includes a sensor capacitor based on one or more pairs of parallel conductor surfaces, a housing to encompass the sensor capacitor, a digitizer module in the housing to generate a digital measurement based on a change in a capacitance of the sensor capacitor when a contact zone of the housing is deflected by a force applied on the contact zone. The apparatus also includes a compensation module of the digitizer module to apply another digital measurement of one or more distortion factors to the digital measurement to minimize an effect of the one or more distortion factors to the apparatus. In addition, the apparatus includes a communication module to communicate an analog signal and/or a digital signal through a wired channel and/or a wireless channel.

16 Claims, 12 Drawing Sheets

UPPER PCB 600

FIGURE 6A

UPPER REFERENCE SURFACE 650

CAPACITIVE DEVICE AND METHOD WITH AN ENHANCED MEASUREMENT ERROR CORRECTION CAPABILITY

FIELD OF TECHNOLOGY

This disclosure relates generally to technical fields of measuring devices and, in one embodiment, to a capacitive device and method with an enhanced measurement error correction capability.

BACKGROUND

A capacitive force-measuring device may be used to gauge a force (e.g., a load) applied on the capacitive force-measuring device, and/or may generate a measurement associated with the force. However, the measurement may be distorted in different degrees based on a number of factors. For example, a load being exerted over the capacitive force-measuring device may be tilted, thus resulting in an error in the measurement. The error may be unavoidable when the capacitive force-measuring device is not stably mounted on a level ground. In addition, a part of the measurement (e.g., in capacitance) may be lost (e.g., due to a stray current) when electrical charges escape from an electrical field formed between a driving plate and a receiving plate of the capacitive force-measuring device.

Also, the measurement may be further distorted when a noise (e.g., a white noise, an impulse noise, etc.) is added to the measurement during a communication (e.g., analog and/or digital) of the measurement to an external device (e.g., which processes the measurement). Furthermore, environmental conditions (e.g., a temperature, a humidity, a pressure, a vibration, a radiation, etc.) may affect components (e.g., a housing, printed circuit boards, fastners, etc.) of the capacitive force-measuring device, thus causing another distortion in the measurement. Moreover, materials (e.g., a stainless steel, a ceramic, a glass, etc.) making up the components may affect the measurement when the materials interact with the environmental conditions, thus causing an expansion and/or a contraction (e.g., uniform and/or non-uniform) of the materials (e.g., the housing, the printed circuit boards, the fastners, etc.).

SUMMARY

A capacitive device and method with an enhanced measurement error correction capability is disclosed. In one aspect, an apparatus includes a sensor capacitor based on one or more pairs of parallel conductor surfaces, a housing (e.g., which is composed of a low creep material such as a 17-4 PH stainless steel, a 15-5 PH stainless steel, and/or a maraging stainless steel; and/or one printed circuit board of the housing to be manufactured with materials such as a flame resistant 4 (FR4), a ceramic, and/or a glass) to encompass the sensor capacitor, a digitizer module in the housing to generate a digital measurement based on a change in a capacitance (e.g., the change in the capacitance of the sensor capacitor is based on a displacement of a distance between an upper sensor surface of the sensor capacitor and a lower sensor surface parallel to the upper sensor surface and/or a displacement of an overlap area between an inner conductive area and an outer conductive area parallel to the inner conductive area) of the sensor capacitor when a contact zone of the housing is deflected by a force applied on the contact zone.

The apparatus also includes a compensation module of the digitizer module to apply another digital measurement of one or more distortion factors to the digital measurement to minimize an effect of the one or more distortion factors to the apparatus. In addition, the apparatus includes a communication module to communicate an analog signal and/or a digital signal (e.g. which includes the change in the capacitance and other data in a universal serial bus (USB) signal, a voltage signal, a frequency signal, and/or a current signal) through a wired channel and/or a wireless channel.

The apparatus may include a reference capacitor having an upper reference surface and a lower reference surface in the housing to compensate an error in the digital measurement based on one or more environmental conditions. The apparatus may also include a processor module having a central procession unit (CPU) to execute a set of instructions associated with the digitizer module, the compensation module, and/or the communication module. The apparatus may further include a wireless communication module of the communication module to wirelessly communicate with an external device based on a wireless universal serial bus (USB), a Wi-Fi, a Bluetooth, and/or a Zigbee.

The apparatus may also include a wired communication module of the communication module to communicate with an external device. Also, the apparatus may include a tilt adaptor surface surrounding the lower sensor surface to minimize the another digital measurement of the one or more distortion factors associated with a tilting effect of the force applied on the contact zone. The apparatus may further include a sensor module in the housing to measure one or more environmental conditions of the apparatus, such as a temperature, a pressure, a radiation, a humidity, a vibration, and/or a motion (e.g., where the another digital measurement of the one distortion factor is based on the one or more environmental conditions).

Moreover, the apparatus may include an alarm module associated with the sensor capacitor to generate a sensory data when a parameter of the digital measurement exceeds a threshold value. The apparatus may also include a capacitance-to-frequency converter module to generate a frequency value (e.g., processed by the digitizer module) based on the change in the capacitance of the sensor capacitor. The apparatus may further include a groove surrounding the contact zone to substantially confine deflection of the contact zone in the groove and/or adjust a degree of the deflection of the contact zone. In addition, the apparatus may include an upper mounting structure (e.g., a threaded stud) and/or a lower mounting structure (e.g., another threaded stud) to fasten the housing to an external structure.

In another aspect, an apparatus includes a sensor capacitor having an upper sensor surface and a lower sensor surface parallel to the upper sensor surface, a housing having a top plate to encompass the sensor capacitor, a sensor in the housing to generate a measurement based on a change in a distance between the upper sensor surface and the lower sensor surface when the top plate is deflected by a load applied on the top plate, and one or more guard rings surrounding all sides of the lower sensor surface except a side of the lower sensor surface facing the upper sensor surface to minimize a stray capacitance through equalizing a potential of the lower sensor surface and a potential of the one or more guard rings.

In yet another aspect, a method includes producing a deflection in a contact zone of a top plate of a housing which encompasses a sensor capacitor having two parallel conductive surfaces when a load is applied on the contact zone, and generating a capacitance data from the sensor capacitor based on a displacement of the two parallel conductive surfaces of the sensor capacitor due to the deflection in the contact zone. The method also includes processing a frequency data associated with the capacitance data using a timer module and minimizing an effect of an input capacitance intrinsic to an operational amplifier coupled to the timer module by driving a power supply of the operational amplifier such that a potential of the input capacitance is substantially equivalent to a potential of a driving plate of the two parallel conductive surfaces of the sensor capacitor.

The method may include compensating an error of the capacitance data due to an effect of one or more environmental conditions (e.g., a temperature, a humidity, a pressure and/or a radiation) to the housing and to one or more printed circuit boards in the housing using a reference capacitor having two parallel conductive surfaces. The method may also include a bonding a lower one of the at least one printed circuit board (PCB) to a bottom plate of the housing using a thermal bonding adhesive fill such that a distortion of the printed circuit board (PCB) due to the one or more environmental conditions is minimized. The method may further include fastening the one or more printed circuit boards (PCBs) to an inner surface of the housing with a connector made of a same material as the housing such that a change in a displacement of a distance between the two parallel conductive surfaces of the sensor capacitor due to the temperature is equivalent to a displacement of a distance between the two parallel conductive surfaces of the reference capacitor.

The method may be executed in a form of a machine-readable medium embodying a set of instructions that, when executed by a machine, cause the machine to perform any of the operations disclose herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A capacitive device and method with an enhanced measurement error correction capability is disclosed. In one embodiment, an apparatus includes a sensor capacitor (e.g., a sensor capacitor 1008 of FIG. 10) based on one or more pairs of parallel conductor surfaces (an upper sensor surface 1004 and a lower sensor surface 1006), a housing (e.g., a housing 1002) to encompass the sensor capacitor, a digitizer module (e.g., a digitizer module 818 of FIG. 8) in the housing to generate a digital measurement (e.g., a measurement 828) based on a change in a capacitance (e.g., ΔC 810) of the sensor capacitor when a contact zone (e.g., a contact zone 106 of FIG. 1A) of the housing is deflected by a force (e.g., a force 104) applied on the contact zone.

Figure 8:
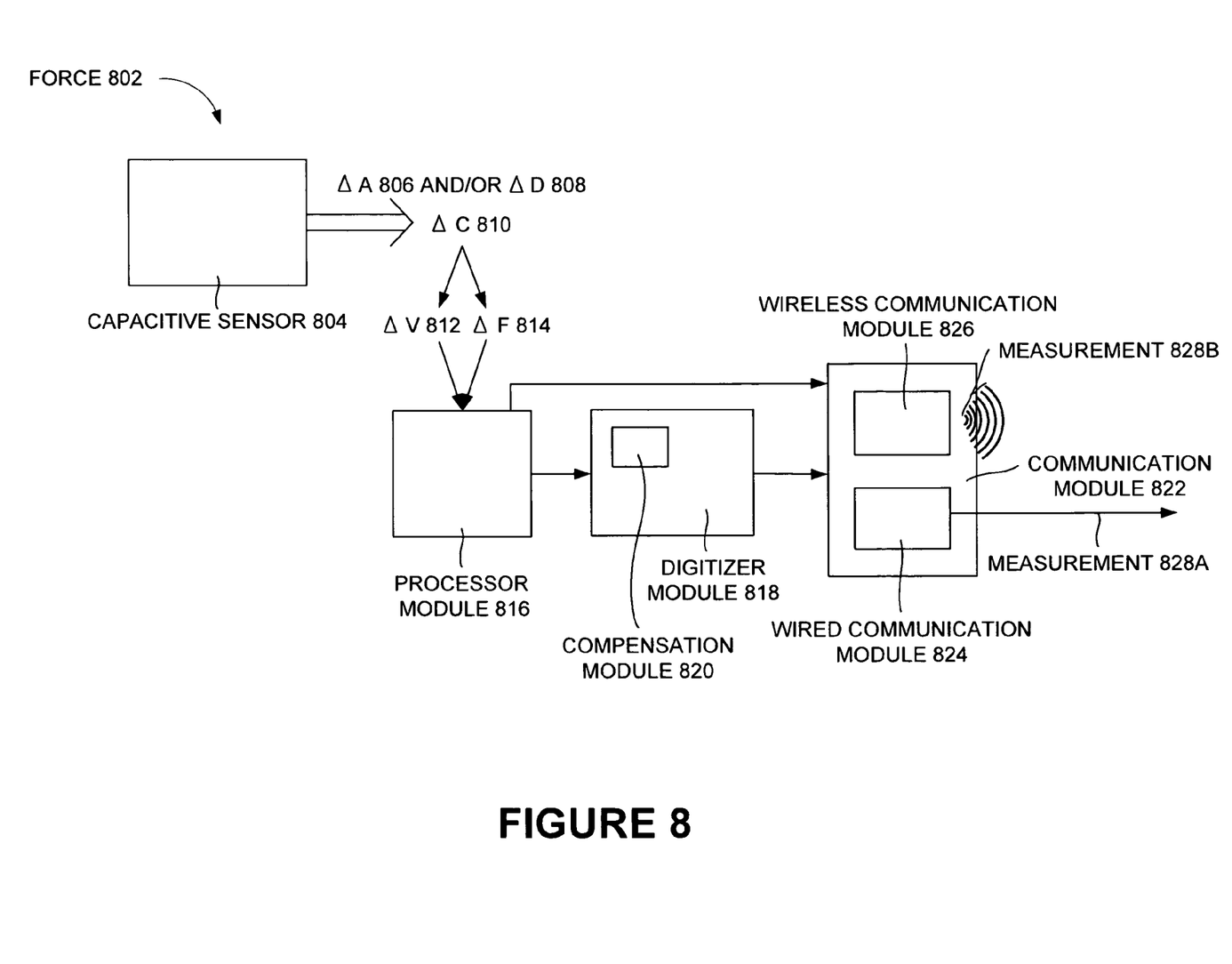
FIG. 8 is a process view of generating a measurement based on a force applied to the capacitive force-measuring device of FIG. 1 and/or communicating the measurement, according to one embodiment.

The apparatus also includes a compensation module (e.g., a compensation module 820) of the digitizer module to apply another digital measurement of one or more distortion factors to the digital measurement to minimize an effect of the one or more distortion factors to the apparatus. In addition, the apparatus includes a communication module (e.g., a communication module 822) to communicate an analog signal and/or a digital signal through a wired channel and/or a wireless channel.

Figure 4:
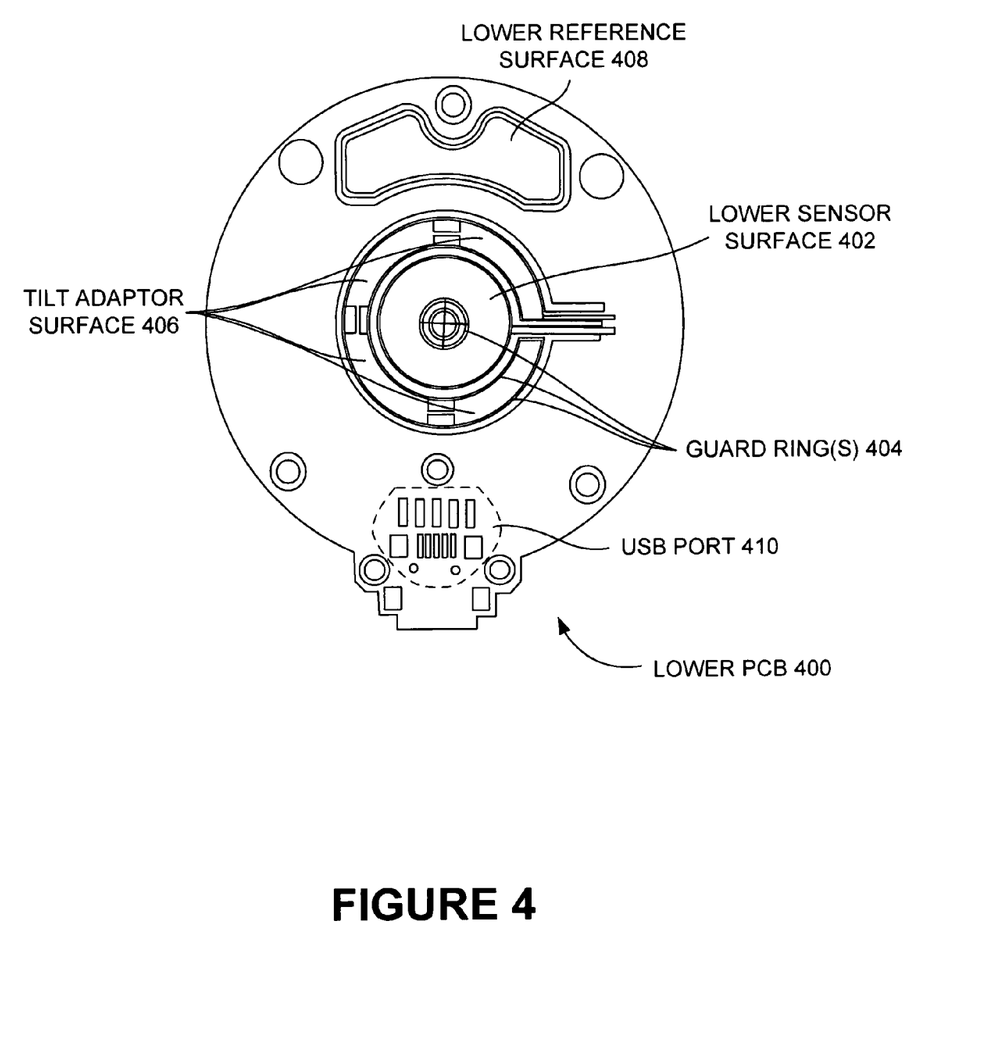
FIG. 4 is a two-dimensional view of a lower printed circuit board of the capacitive force-measuring device of FIG. 1, according to one embodiment.

In another embodiment, an apparatus includes a sensor capacitor having an upper sensor surface and a lower sensor surface parallel to the upper sensor surface, a housing having a top plate (e.g., a top plate 202 of FIG. 2) to encompass the sensor capacitor, a sensor (e.g., a capacitive sensor 804) in the housing to generate a measurement (e.g., ΔC 810) based on a change in a distance (e.g., ΔD 808) between the upper sensor surface and the lower sensor surface when the top plate is deflected by a load applied on the top plate, and one or more guard rings (e.g., guard ring(s) 404 of FIG. 4) surrounding all sides of the lower sensor surface except a side of the lower sensor surface facing the upper sensor surface to minimize a stray capacitance through equalizing a potential of the lower sensor surface and a potential of the one or more guard rings.

In yet another embodiment, a method includes producing a deflection in a contact zone of a top plate of a housing which encompasses a sensor capacitor having two parallel conductive surfaces when a load is applied on the contact zone, and generating a capacitance data from the sensor capacitor based on a displacement of the two parallel conductive surfaces of the sensor capacitor due to the deflection in the contact zone. The method also includes processing a frequency data (e.g., ΔF 814) associated with the capacitance data (e.g., ΔC 810) using a timer module (e.g., connected to the digitizer module 818) and minimizing an effect of an input capacitance intrinsic to an operational amplifier coupled to the timer module (e.g., to a measurement of the sensor capacitor) by driving a power supply of the operational amplifier such that a potential of the input capacitance is substantially equivalent to a potential of a driving plate of the two parallel conductive surfaces of the sensor capacitor.

Figure 1A:
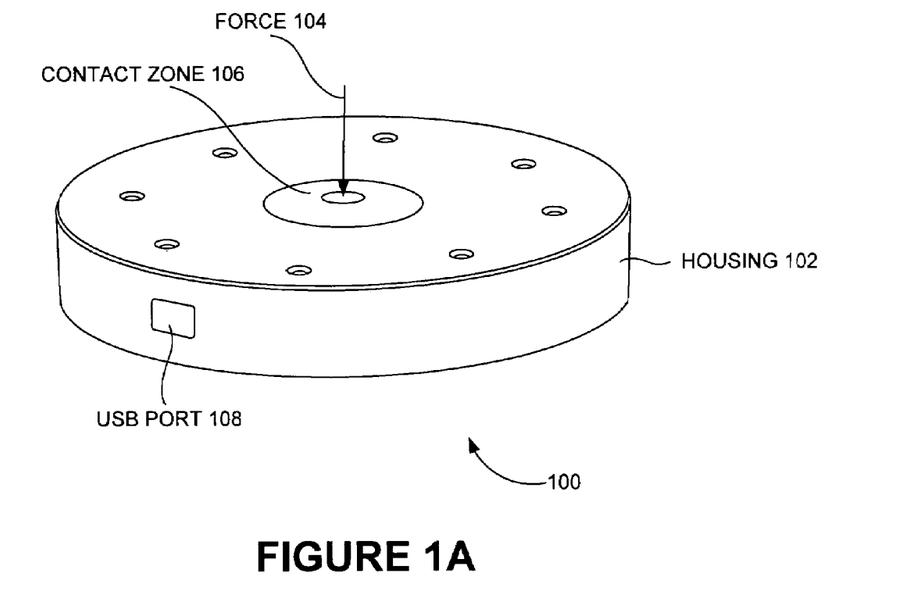
FIGS. 1A and 1B are three-dimensional views of a capacitive force-measuring device having a universal serial bus (USB) port and a capacitive force-measuring device connecting an external device with a cable, respectively, according to one embodiment.
Figure 1B:
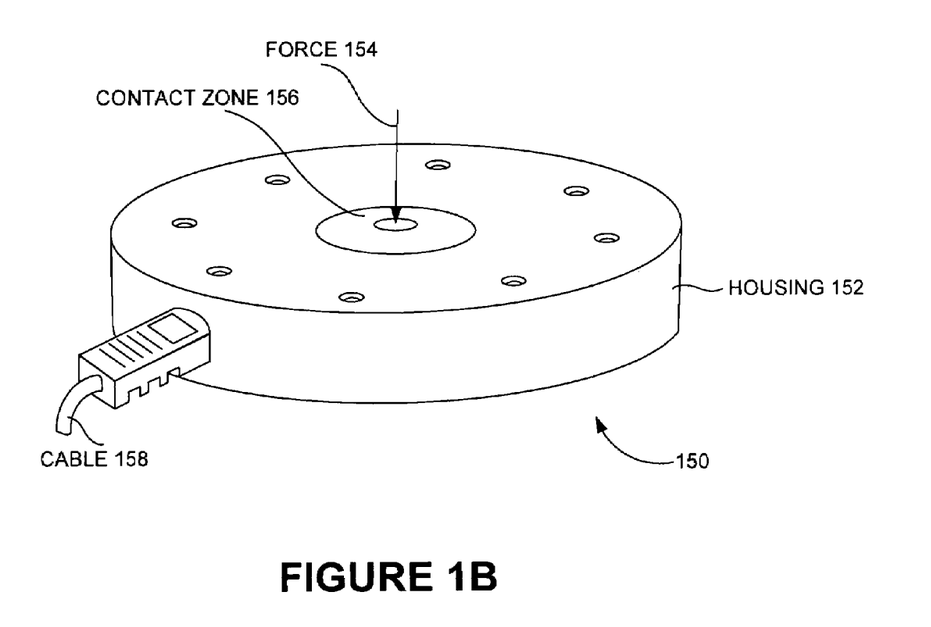

FIGS. 1A and 1B are three-dimensional views of a capacitive force-measuring device having a universal serial bus (USB) port 100 and a capacitive force-measuring device connecting an external device with a cable 158, respectively, according to one embodiment. In FIG. 1A, the capacitive force-measuring device 100 (e.g., a cylindrical device, a square device, etc.) may include a housing 102, a contact zone 106, and a universal serial bus port 108. In one example embodiment, a force 104 (e.g., a load, a weight, a pressure, etc.) may be applied on the contact zone 106 deflecting a top plate (e.g., a top plate 202 of FIG. 2) of the housing 102. The top plate deflected by the force 104 may produce a displacement of a distance and/or an area between an upper conductor of a sensor capacitor of the capacitive force-measuring device 100 and a lower conductor of the sensor capacitor, thus producing a change in capacitance. The USB port 108 may be used to communicate a data (e.g., an analog data and/or a digital data such as the change in capacitance) to an external device (e.g., a data processing system such as a computer, a PDA, etc. and/or a data storage device such as a USB driver, etc.).

In FIG. 1B, the capacitive force-measuring device 150 (e.g., a cylindrical device, a square device, etc.) may include a housing 152, a contact zone 156, and a cable 158. In one example embodiment, a force 154 (e.g., a load, a weight, a pressure, etc.) may be applied on the contact zone 156 deflecting a top plate (e.g., a top plate 202 of FIG. 2) of the housing 152.

The top plate deflected by the force 154 may produce a displacement of a distance and/or an area between an upper conductor of a sensor capacitor of the capacitive force-measuring device 150 and a lower conductor of the sensor capacitor, thus producing a change in capacitance. As illustrated in FIG. 1B, the cable 158 may be used to communicate a data (e.g., an analog data and/or a digital data such as the change in capacitance) to an external device (e.g., a data processing system such as a computer, a PDA, etc.).

In one example embodiment, a housing (e.g., the housing 102 and/or the housing 152) may be made of a conductive and/or nonconductive material. In case the nonconductive material is being used, the nonconductive material may be painted (e.g., sputtered, coated, etc.) with the conductive material. In addition, the housing may be composed of a low creep material which includes at least one of a 17-4 PH stainless steel, a 15-5 PH stainless steel, and a maraging stainless steel (e.g., which is an iron alloy free of carbon known for possessing superior strength without losing malleability where an iron base is alloyed principally with a large percentage of nickel to produce a very specific heat-treatment product along with other alloying elements such as molybdenum, aluminum, copper, titanium, cobalt, etc. to produce an inter-metallic precipitates). One or more printed circuit boards in the housing may also be composed of a plurality of materials including at least one of a flame resistant 4 (FR4) (e.g., which is less lossy at high frequencies, absorbs less moisture, has greater strength and stiffness and/or is highly flame resistant compared to its less costly counterpart), a ceramic, and a glass.

Figure 2:
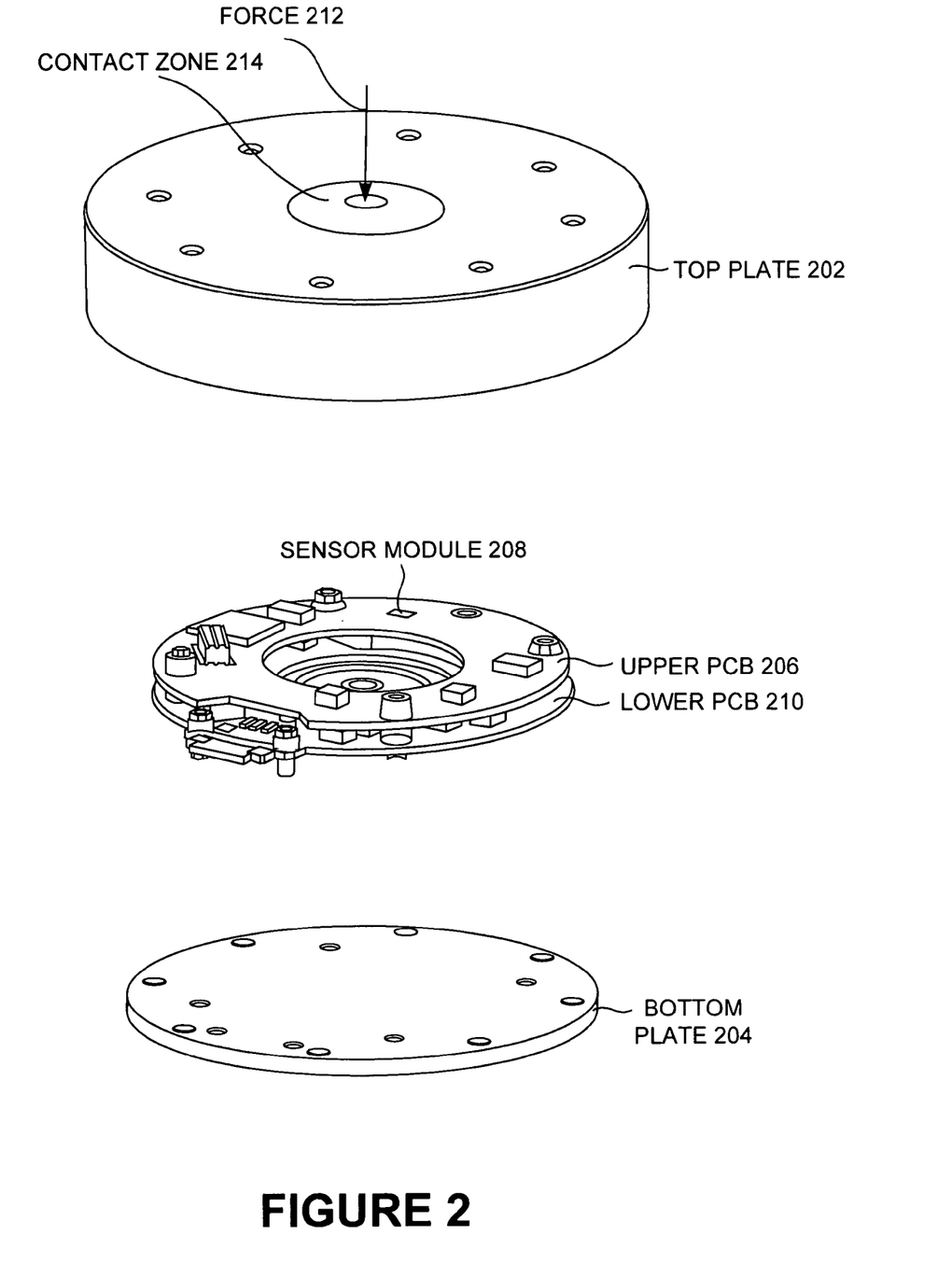
FIG. 2 is a three-dimensional view of major components of the capacitive force-measuring device of FIG. 1, according to one embodiment.

FIG. 2 is a three-dimensional view of major components of the capacitive force-measuring device 100 of FIG. 1, according to one embodiment. As illustrated in FIG. 2, the capacitive force-measuring device 100 (e.g., and/or the capacitive force-measuring device 150) includes a top plate 202, a bottom plate 204, an upper printed circuit board (PCB) 206, a sensor module 208, a lower printed circuit board (PCB) 210, and/or a contact zone 214. The top plate 202 and/or the bottom plate 204 may be made of a conductive material (e.g., a stainless steel) and/or a nonconductive material to isolate any electronic module (e.g., PCBs) in the housing from an external electromagnetic noise.

The upper PCB 206 and/or the lower PCB 210 may include a number of circuitry and/or conductive surfaces (e.g., of one or more of sensor capacitors and/or a reference capacitor) associated with the capacitive force-measuring device 100 (e.g., and/or the capacitive force-measuring device 150) of FIG. 1. The sensor module 208 may measure one or more environmental conditions (e.g., a temperature, a pressure, a radiation, a humidity, a vibration, and a motion, etc.) of the capacitive force-measuring device 100. A digital (e.g., and/or analog) measurement of the one or more environmental conditions may be used to lessen an effect of a distortion (e.g., due to the one or more environmental conditions) on the capacitive force-measuring device 100. The force 212 applied to the contact zone 214 may initiate a process of measuring a capacitance data processed in the capacitive force-measuring device 100.

In one example embodiment, the lower printed circuit board (PCB) 210 may be bonded to the bottom plate 204 using a thermal bonding adhesive fill such that a distortion of the printed circuit board (PCB) due to the one or more environmental conditions is minimized. In another example embodiment, the upper PCB 206 and/or the lower PCB 210 may be fastened to an inner surface of the housing (e.g., the top plate 202 and/or the bottom plate 204) with a connector (e.g., a screw, a bolt, a threaded stud, etc.) made of a same material as the housing (e.g., a stainless steel) such that a change in a displacement of a distance between two parallel conductive surfaces of a sensor capacitor due to a temperature (e.g., applied to the capacitive force-measuring device 100) may be equivalent to a displacement of a distance between two parallel conductive surfaces of a reference capacitor.

Figure 3A:
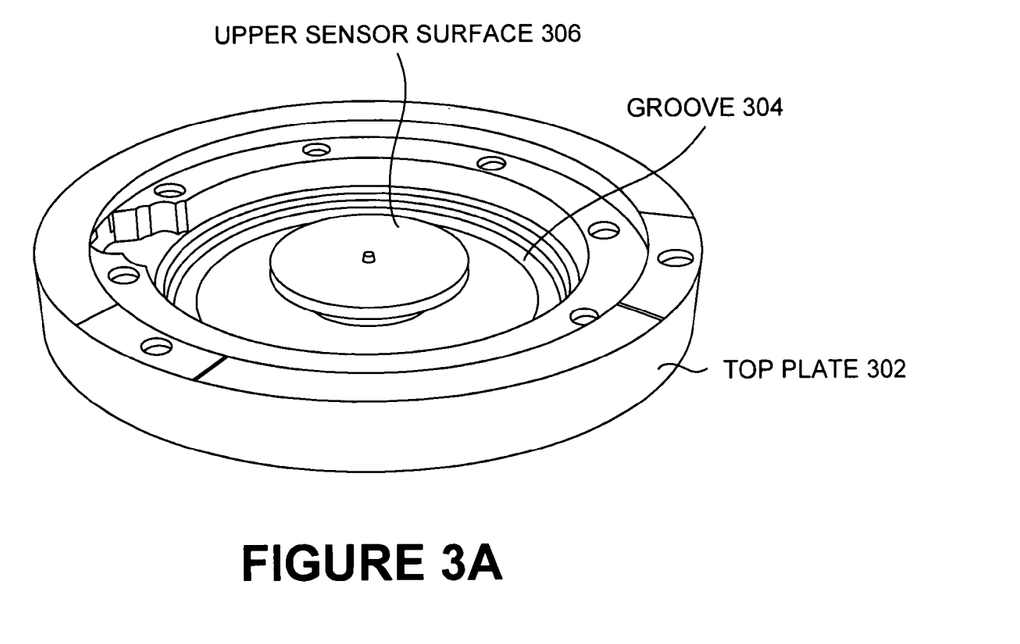
FIGS. 3A and 3B are three-dimensional views of the top plate and the bottom plate of the force-measuring device of FIG. 1, according to one embodiment.
Figure 3B:
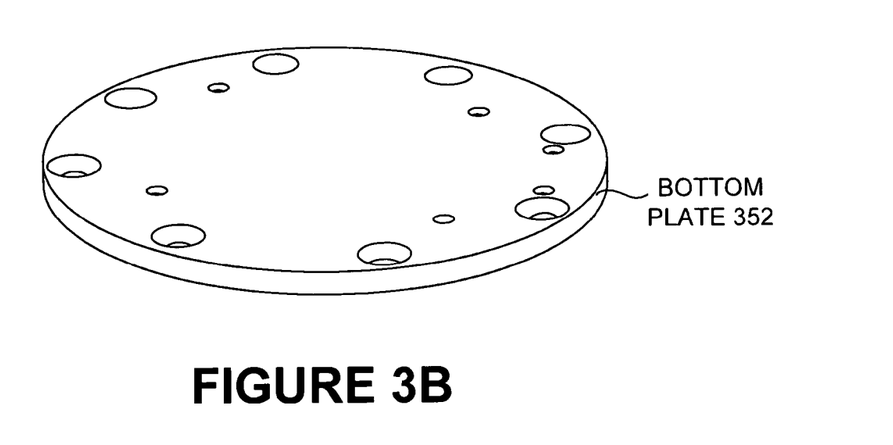

FIGS. 3A and 3B are three-dimensional views of the top plate 302 and the bottom plate 352 of the capacitive force-measuring device 100 of FIG. 1, according to one embodiment. The top plate 302 and/or the bottom plate 352 may be identical to the top plate 202 and/or the bottom plate 204 of FIG. 2. The groove 304 may be formed on an outer surface and/or an inner surface of the top plate 302. A depth, a width and two radii of the groove 304 may be engineered (e.g., mathematically, algorithmically, etc.) to provide a particular deflection rate of the capacitive force-measuring device 100 of FIG. 1. The groove 304 surrounding the contact zone 214 of FIG. 2 may substantially confine a deflection of the contact zone 214 in the groove 304. The upper sensor surface 306 (e.g., which may be a conductive material such as a stainless steel) may be a receiving plate (e.g., coupled to the ground) of a sensor capacitor (e.g., formed by the lower sensor surface 402 and the upper sensor surface 306 of FIG. 3) of the capacitive force-measuring device 100.

FIG. 4 is a two-dimensional view of a lower printed circuit board (PCB) 400 of the capacitive force-measuring device 100 of FIG. 1, according to one embodiment. The lower PCB 400 includes a lower sensor surface 402, guard rings 404, a tilt adaptor surface 406, a lower reference surface 408, and/or a universal serial bus (USB) port 410. The lower PCB 400 may be a layered printed circuit board and/or may be bonded to the bottom plate 204 of FIG. 2. The lower sensor surface 402 (e.g., which may be printed on a top surface of the lower PCB 400) may be a driving plate of a sensor capacitor (e.g., formed by the lower sensor surface 402 and the upper sensor surface 306 of FIG. 3) of the capacitive force-measuring device 100.

The guard rings 404 (e.g., three guard rings) may surround all sides of the lower sensor surface 402 except a side of the lower sensor surface facing the upper sensor surface 306 to minimize a stray capacitance through equalizing a potential of the lower sensor surface 402 and a potential of the one or more of the guard rings 404.

The tilt adaptor surface 406 may surround the lower sensor surface 402 to minimize a distortion associated with a tilting effect of the force 212 of FIG. 2 applied to the contact zone 214. The lower reference surface 408 (e.g., which may be printed on a top surface of the lower PCB 400) may be a driving plate of a reference capacitor (e.g., formed by the lower sensor surface 402 and an upper reference surface 650 of FIG. 6) of the capacitive force-measuring device 100. The USB port 410 may be used to connect one or more external devices, such as a printer, an external storage device, a networking component, etc.

In one example embodiment, a sensor (e.g., capacitive) formed between the upper sensor surface 306 and the lower sensor surface 402 parallel to the upper sensor surface 306 may generate a measurement based on a change in a distance between the upper sensor surface 306 and the lower sensor surface 402 when the top plate 302 is deflected by the force 212 applied on the top plate 302. Also, a distortion may be measured by subtracting a difference between a first measurement (e.g., digital) obtained by an adaptor sensor formed between the tilt adaptor surface 406 and the upper sensor surface 306 and a second measurement (e.g., digital) obtained by a capacitive sensor formed between the lower sensor surface 402 and the upper sensor surface 306. The distortion may be processed in the compensation module 820 of FIG. 8 to enhance an accuracy of a measurement of the force 212.

Figure 5:
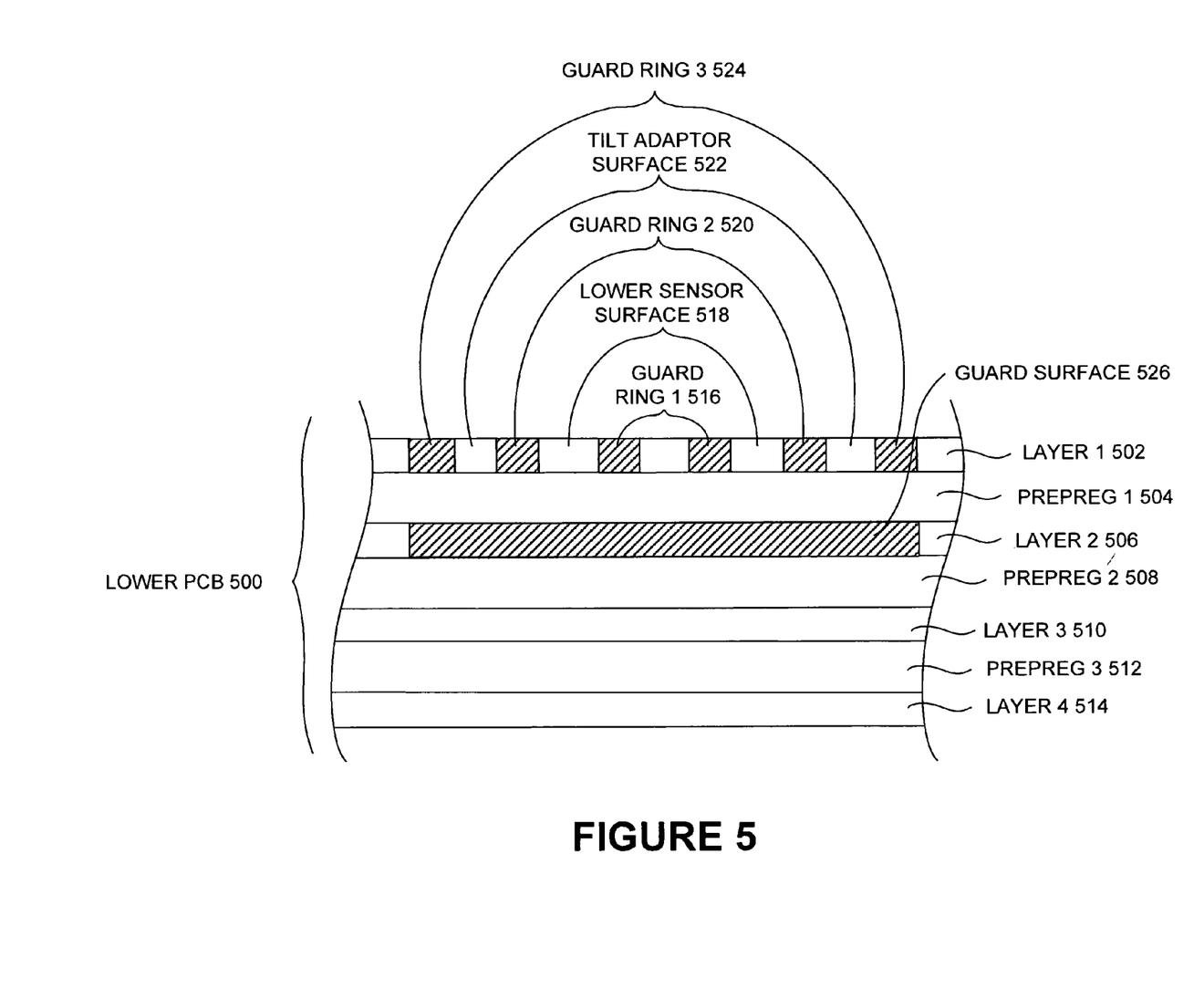
FIG. 5 is a cross sectional view of the lower printed circuit board of FIG. 4, according to one embodiment.

FIG. 5 is a cross sectional view of the lower printed circuit board of FIG. 4, according to one embodiment. In FIG. 5, the lower PCB 500 includes a layer 1 502, a prepreg 1 504, a layer 2 506, a prepreg 2 508, a layer 3 510, a prepreg 3 512, a layer 4 514, a guard ring 1 516, a lower sensor surface 518, a guard ring 2 520, a tilt adaptor surface 522, a guard ring 3 524, and a guard surface 526. The lower PCB 500 may be a layered printed board and/or may be bonded to the bottom plate 204 of FIG. 2.

The layer 1 502 may be painted to form the guard ring 1 516, the lower sensor surface 518, the guard ring 2 520, the tilt adaptor surface 522, and/or the guard ring 3 524. The prepreg 1 504, the prepreg 2 508, and the prepreg 3 512 may be made by impregnating fibers such as a carbon fiber, a glass fiber, and/or an aramid fiber with uncured thermosetting resins (epoxy resins) and may come in various types, including unidirectional, woven, and/or roving. The layer 2 506 hosts the guard surface 526 having its area larger than the entire conductive surface painted on the layer 1 502. The guard ring 1 516, the guard ring 2 520, and the guard surface 526 surround the lower sensor surface 518 (e.g., the lower sensor surface 402 of FIG. 4). The guard ring 2 520, the guard ring 3 524, and the guard surface 526 surround the tilt adaptor surface 522 (e.g., the tilt adaptor surface 406).

In one example embodiment, as illustrated in FIG. 5, the guard ring 1 516, the guard ring 2 520, and the guard surface 526 may surround all sides of the lower sensor surface 518 except a side of the lower sensor surface 518 facing the upper sensor surface 306 to minimize a stray capacitance through equalizing a potential of the lower sensor surface 402 and potentials of the guard ring 1 516, the guard ring 2 520, and the guard surface 526. In another example embodiment, the guard ring 2 520, the guard ring 3 524, and the guard surface 526 may surround all sides of the tilt adaptor surface 522 except a side of the lower sensor surface 518 facing the upper sensor surface 306 to minimize a stray capacitance through equalizing a potential of the lower sensor surface 518 and potentials of the guard ring 2 520, the guard ring 3 524, and the guard surface 526.

Figure 6A:
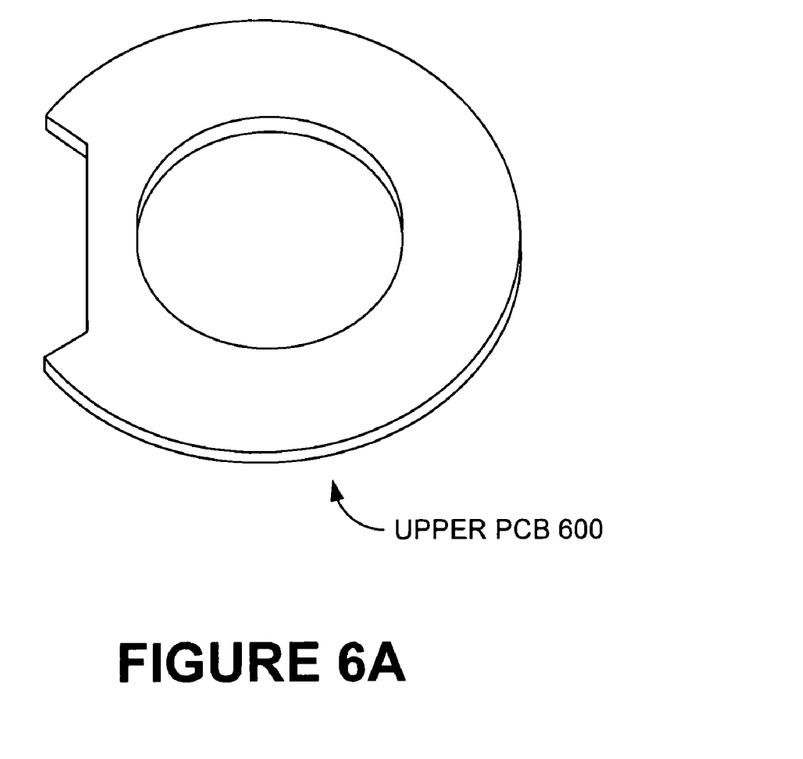
FIGS. 6A and 6B are three dimensional views of an upper printed circuit board and an upper reference surface of the capacitive force-measuring device of FIG. 1, according to one embodiment.
Figure 6B:
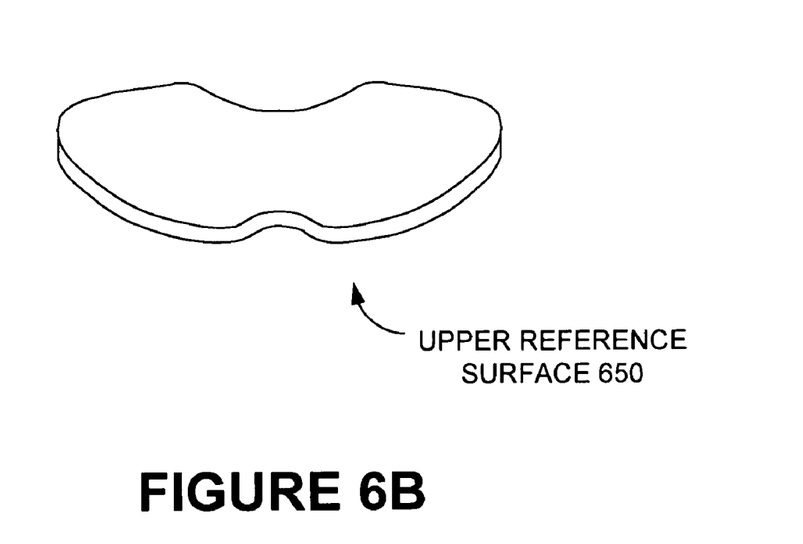

FIGS. 6A and 6B are three dimensional views of an upper printed circuit board (PCB) 600 and an upper reference surface 650 of the capacitive force-measuring device 100 of FIG. 1, according to one embodiment. The upper PCB 600 (e.g., the upper PCB 206 of FIG. 2) may include a number of circuitry associated with the capacitive force-measuring device 100 (e.g., and/or the capacitive force-measuring device 150) of FIG. 1. The upper reference surface 650 (e.g., which may be a conductive material such as a stainless steel) may be a receiving plate (e.g., coupled to the ground) of a reference capacitor (e.g., formed by the lower reference 408 of FIG. 4 and the upper reference surface 650) of the capacitive force-measuring device 100.

Figure 7A:
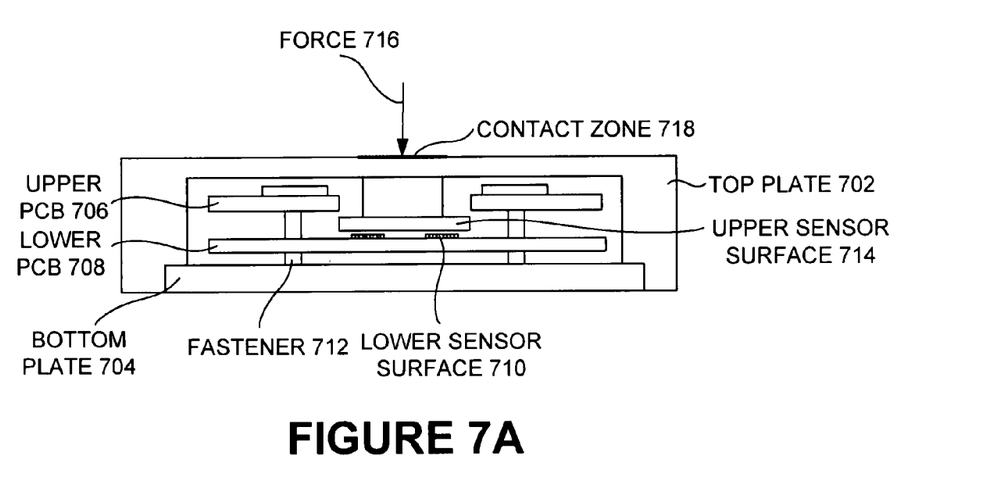
FIGS. 7A, 7B, 7C, and 7D are cross-sectional views of the capacitive force-measuring device, whereas FIGS. 7A, 7B, and 7C display three different ways of forming the sensor capacitor and FIG. 7D displays a formation of the reference capacitor, according to one embodiment.
Figure 7B:
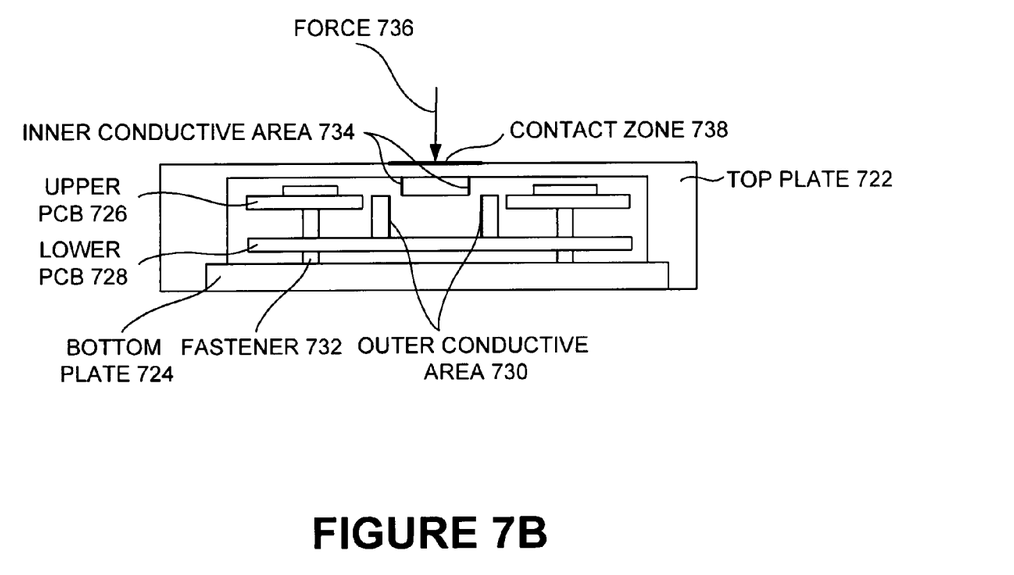
Figure 7C:
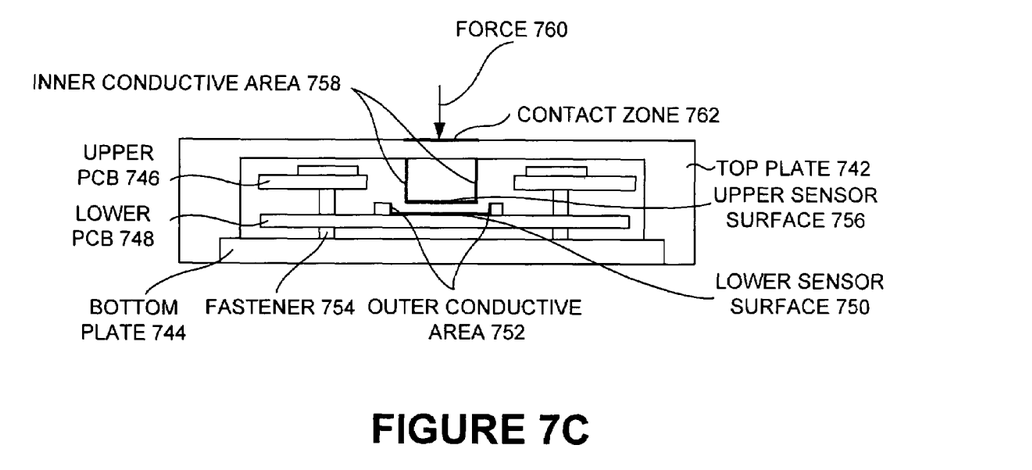
Figure 7D:
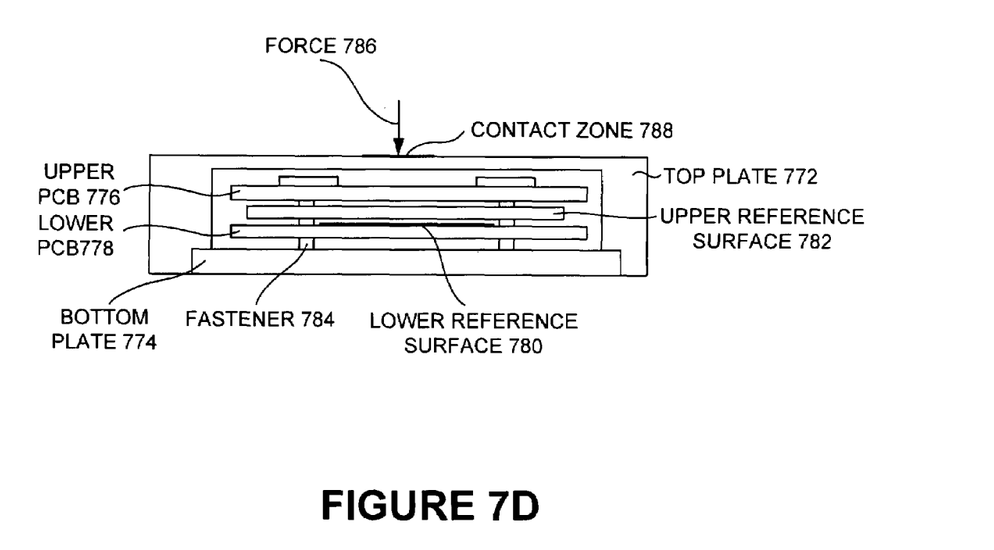

FIGS. 7A, 7B, 7C, and 7D are cross-sectional views of the capacitive force-measuring device, whereas FIGS. 7A, 7B, and 7C display three different ways of forming a sensor capacitor and FIG. 7D displays a formation of a reference capacitor, according to one embodiment.

In FIG. 7A the capacitive force measuring device 100 (e.g., and/or the capacitive force-measuring device 150) includes a top plate 702, a bottom plate 704, an upper PCB 706, a lower PCB 708, a lower sensor surface 710, a fastener 712, an upper sensor surface 714, and a contact zone 718. A sensor capacitor may be formed between the upper sensor surface 714 and the lower sensor surface 710. The upper PCB 706, the lower PCB 708 and the bottom plate 704 may be adjoined together using the fastener 712.

A deflection of the top plate 702 (e.g., due to the force 716) may cause a change in a distance between the upper sensor surface 714 and the lower sensor surface 710 of the sensor capacitor. The change in the distance may bring about a change in capacitance of the sensor capacitor. In one example embodiment, the upper sensor surface 714 and the lower sensor surface 710 are substantially parallel to each other and have the same physical area and/or thickness. The change in capacitance of the sensor capacitor may be inversely proportional to the change in the distance.

In FIG. 7B, the capacitive force measuring device 100 (e.g., and/or the capacitive force-measuring device 150) includes a top plate 722, a bottom plate 724, an upper PCB 726, a lower PCB 728, an outer conductive area 730, a fastener 732, an inner conductive area 734, and a contact zone 738. A sensor capacitor may be formed between the inner conductive area 734 and the outer conductive area 730. The upper PCB 726, the lower PCB 728 and the bottom plate 724 may be adjoined together using the fastener 732.

A deflection of the top plate 722 (e.g., due to the force 720) may cause a change in an overlap area of the inner conductive area 734 and the outer conductive area 730 of the sensor capacitor. The change in the overlap area may bring about a change in capacitance of the sensor capacitor. In one example embodiment, the inner conductive area 734 and the outer conductive area 730 may be substantially parallel to each other and have the same physical area and/or thickness. The change in capacitance of the sensor capacitor may be proportional to the change in the overlap area.

In FIG. 7C, the capacitive force measuring device 100 (e.g., and/or the capacitive force-measuring device 150) includes a top plate 742, a bottom plate 744, an upper PCB 746, a lower PCB 748, a lower sensor surface 750, an outer conductive area 752, a fastener 754, an upper sensor surface 756, an inner conductive area 758, and a contact zone 762. A sensor capacitor may be formed between the upper sensor surface 756 and the lower sensor surface 750 and/or between the inner conductive area 758 and the outer conductive area 752. The upper PCB 746, the lower PCB 748 and the bottom plate 744 may be adjoined together using the fastener 754.

A deflection of the top plate 742 (e.g., due to the force 760) may cause a change in a distance between the upper sensor surface 756 and the lower sensor surface 750 and/or a change in an overlap area of the inner conductive surface 758 and the outer conductive area 752 of the sensor capacitor. The change in the distance and/or the overlap area may bring about a change in capacitance of the sensor capacitor. In one example embodiment, the upper sensor surface 756 and the lower sensor surface 750 (e.g., the inner conductive area 758 and the outer conductive area 752) are substantially parallel to each other and have the same physical area and/or thickness. The change in capacitance of the sensor capacitor may be inversely proportional to the change in the distance and/or proportional to the change in the overlap area.

In FIG. 7D, the capacitive force measuring device 100 (e.g., and/or the capacitive force-measuring device 150) includes a top plate 772, a bottom plate 774, an upper PCB 776, a lower PCB 778, a lower reference surface 780, an upper reference surface 782, a fastener 784, and a contact zone 788. A reference capacitor may be formed between the upper reference surface 782 and the lower reference surface 780. The upper PCB 776, the lower PCB 778 and the bottom plate 774 may be adjoined together using the fastener 784.

The reference sensor may experience a change in capacitance for environmental factors (e.g., a humidity, a temperature, an air pressure, a radiation, etc.). Therefore, the environmental factors may be removed from a measurement of a change in capacitance of the sensor capacitor when the force 786 is applied to the capacitive force-measuring device 100 (e.g., thereby allowing a user to determine the change in capacitance of the sensor capacitor more accurately).

FIG. 8 is a process view of generating a measurement 828 based on a force 802 applied to the capacitive force-measuring device 100 of FIG. 1 and/or communicating the measurement 828, according to one embodiment. In FIG. 8, a force 802 may be applied to a capacitive sensor 804 when the top plate 702 of FIG. 7 is deflected by the force 802, according to one embodiment. An electronic circuitry (e.g., a software and/or hardware code) may apply an algorithm to measure a change in distance 808 between two plates (e.g., the upper sensor surface 714 and the lower sensor surface 710) of the sensor capacitor and/or a change in overlap area 806 between another two plates (e.g., the inner conductive area 734 and the outer conductive area 730) when the force 802 is applied to the capacitive force-measuring device 100.

Next, the change in capacitance 810 may be calculated based on the change in distance 808 between the two plates and/or the change in the overlap area 806 between the another two plates forming the sensor capacitor. The change in capacitance 810, a change in voltage 812, and/or a change in a frequency 814 may also be calculated to generate a measurement (e.g., an estimation of the force 802 applied to the capacitive sensor 804). Data which encompasses the change in capacitance 810, the change in voltage 812, and/or the change in frequency 814 may be provided to a processor module 816 which directly communicate to a communication module 822 (e.g., for analog data) and/or to a digitizer module 818 (e.g., for digital data). The digitizer module 818 may work with the processor module 816 (e.g., a microprocessor which may be integrated in a signaling circuit of the upper PCB 206 and/or the lower PCB 210 of FIG. 2) to convert the change in capacitance 810, the change in voltage 812, and/or the change in frequency 814 to the measurement 828.

The digitizer module 818 may also include a compensation module 820. The compensation module 820 may apply a measurement (e.g., digital) of one or more distortion factors to another measurement (e.g., digital) to minimize an effect of the one or more distortion factors to the capacitive force-measuring device 100 of FIG. 1.

The communication module 822 includes a wired communication module 824 and a wireless communication module 826. The wired communication module 824 may communicate a universal serial bus (USB) signal, a voltage signal, a frequency signal, and/or a current signal in an analog and/or digital form to an external device. The wireless communication module 826 may wirelessly communicate with the external device based on one or more of wireless universal serial bus (USB), a Wi-Fi (e.g., of a wireless local area network), a Bluetooth (e.g., of a wireless personal area network), and/or a Zigbee (e.g., of the wireless personal are network).

In one example embodiment, the processor module 816 having a central procession unit (CPU) may execute a set of instructions associated with the digitizer module 818, the compensation module 820, and/or the communication module 822. In another example embodiment, a capacitance-to-frequency converter module may generate frequency data based on capacitance data of the capacitive sensor 804. The frequency data may be processed using a timer module (e.g., 555 timer circuit) coupled to the digitizer module 818. An effect of an input capacitance intrinsic to an operational amplifier coupled to the timer module may be minimized by driving a power supply of the operational amplifier such that a potential (e.g., voltage) of the input capacitance is substantially equivalent to a potential of a driving plate (e.g., the lower sensor surface 402 of FIG. 4) of the capacitive sensor 804.

Figure 9:
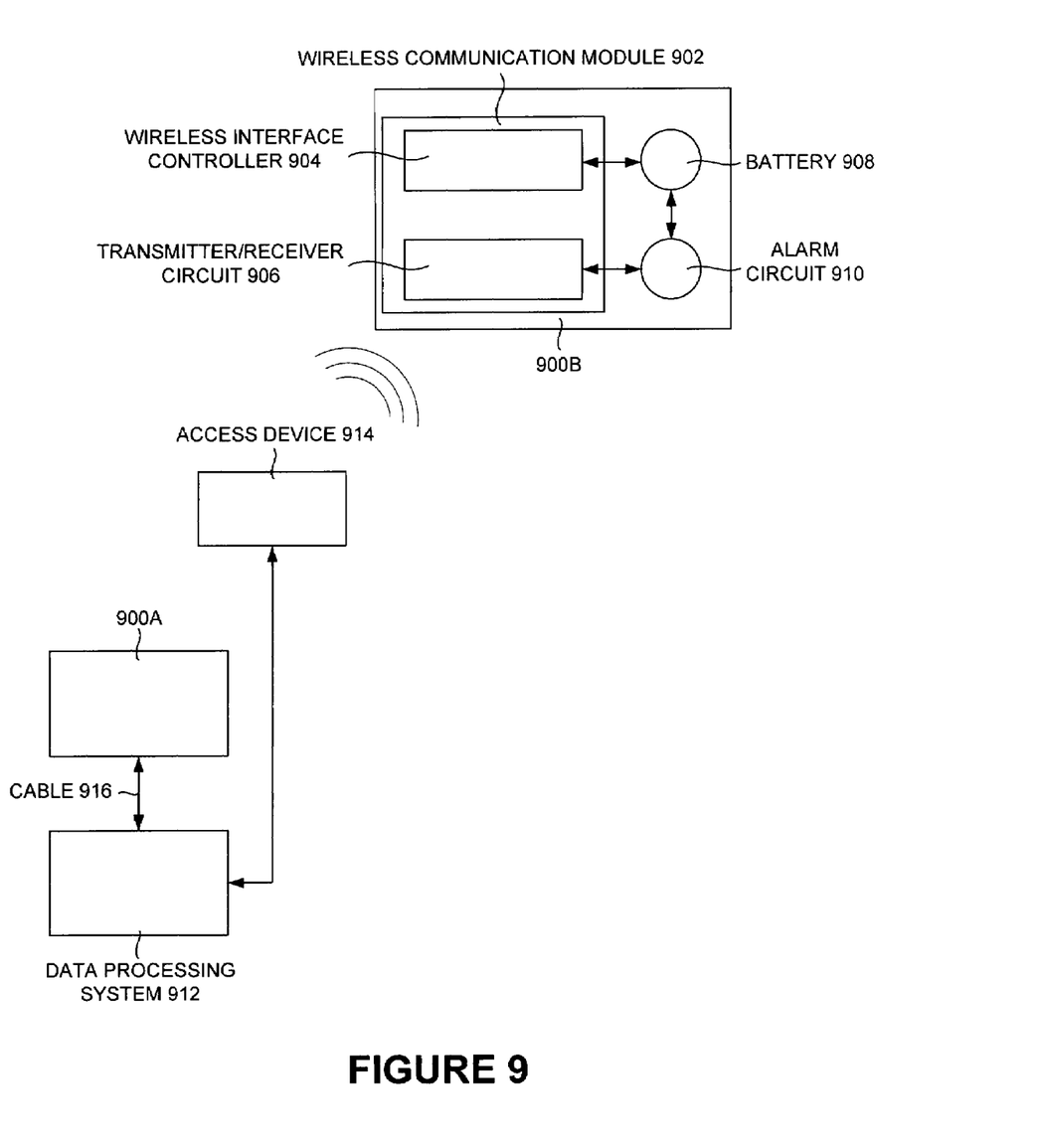
FIG. 9 is a network enabled view of the capacitive force-measuring device of FIG. 1, according to one embodiment.

FIG. 9 is a network enabled view of the capacitive force-measuring device 100 of FIG. 1, according to one embodiment. The capacitive force-measuring device 900A is connected to a data processing system 912 (e.g., an external device) through a cable 916 as illustrated in FIG. 9. A capacitive force-measuring device 900B is wirelessly connected to the data processing system 912 through an access device 914 (e.g., a device which enables wireless communication between devices forming a wireless network). The capacitive force-measuring device 900B includes a wireless communication module 902 (e.g., the wireless communication module 826 of FIG. 8) having a transmitter/receiver circuit 906 and a wireless interface controller 904 (e.g., for wireless communication), a battery 908 (e.g., to sustain as a standalone device), and an alarm circuit 910 (e.g., to alert a user when the force to the capacitive force-measuring device 100 is greater than a threshold value and/or when the battery is almost out).

The data processing system 912 may receive data (e.g., output data measuring a force and/or a load, data measured by the sensor module 208 of FIG. 2, etc.) from the capacitive force-measuring device 900A and/or the capacitive force-measuring device 900B. In one embodiment, the data processing system 912 may analyzes data (e.g., the measurement 828) generated by various operation of the capacitive force-measuring device 100. In another example embodiment, a universal serial bus (USB) may be included in a signaling layer of the capacitive force measuring device 100 and/or the capacitive force measuring device 150 of FIG. 1. The USB (e.g., a USB port or hub with mini sockets) may allow a hardware interface for the data processing system 912 (e.g., which may be an external device) and/or a hardware interface for attaching a peripheral device (e.g., a storage device such as a flash drive, etc.).

Figure 10:
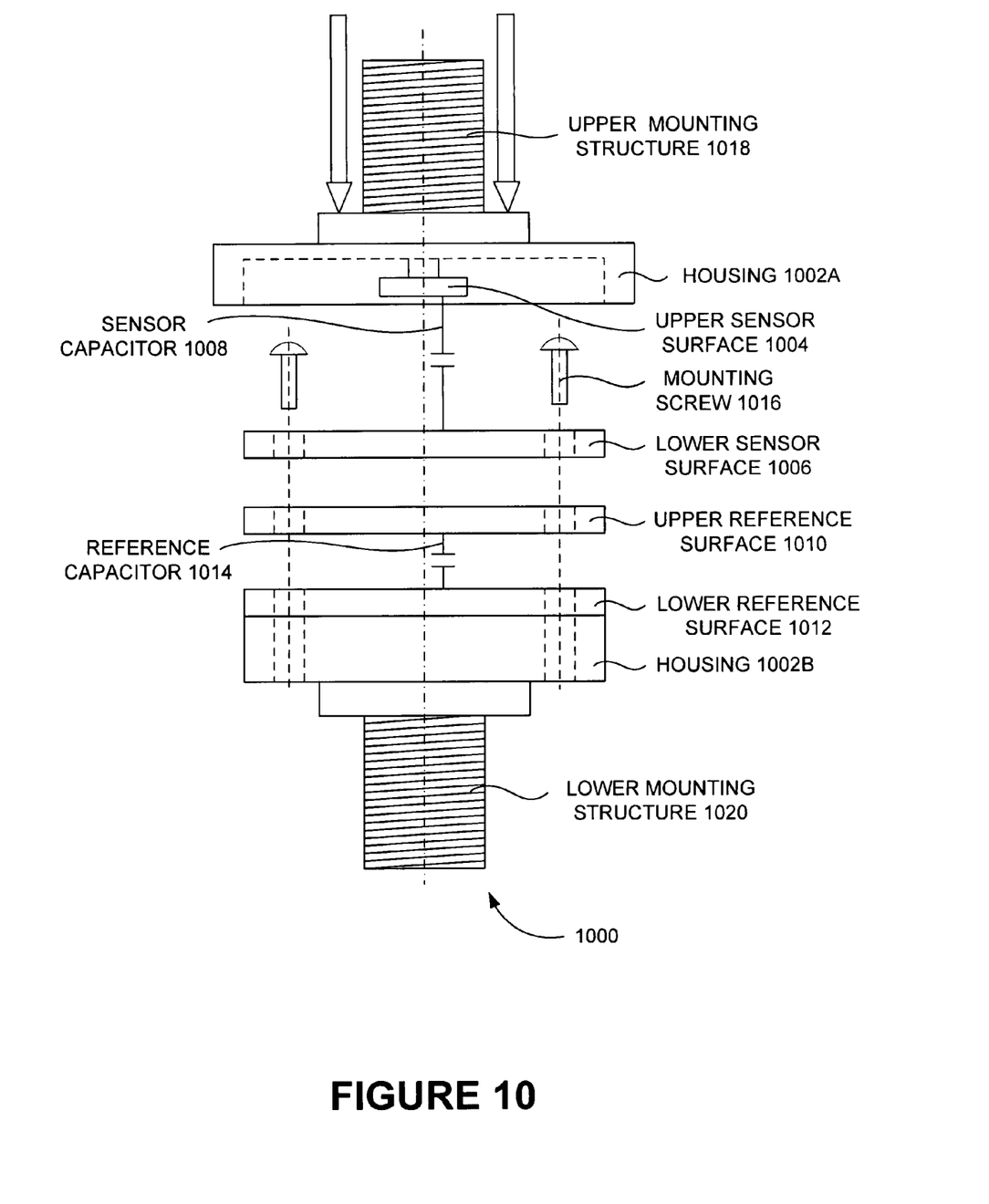
FIG. 10 is a cross sectional view of the capacitive force-measuring device having a mounting structure, according to one embodiment.

FIG. 10 is a cross sectional view of a capacitive force-measuring device having a mounting structure 1000, according to one embodiment. The capacitive force-measuring device 100 having the mounting structure includes a housing 1002, an upper sensor surface 1004, a lower sensor surface 1006, a sensor capacitor 1008, an upper reference surface 1010, a lower reference surface 1012, a reference capacitor 1014, mounting screws 1016, an upper mounting structure 1018, and a lower mounting structure 1020. As illustrated in FIG. 10, the mounting screws 1016 may be used to fasten the lower sensor surface 1006, the upper reference surface 1010, the lower reference surface 1012, and the housing 1002B. The upper mounting structure 1018 (e.g., in a threaded stud) may be used to fasten the capacitive force-measuring device having the mounting structure 1000 to an external structure (e.g., a seat device such as a car seat device, an airplane seat device, etc.). The lower mounting structure 1020 (e.g., in another threaded stud) may be used to fasten the capacitive force-measuring device having the mounting structure 1000 to an external structure (e.g., a mounting rail).

Figure 11:
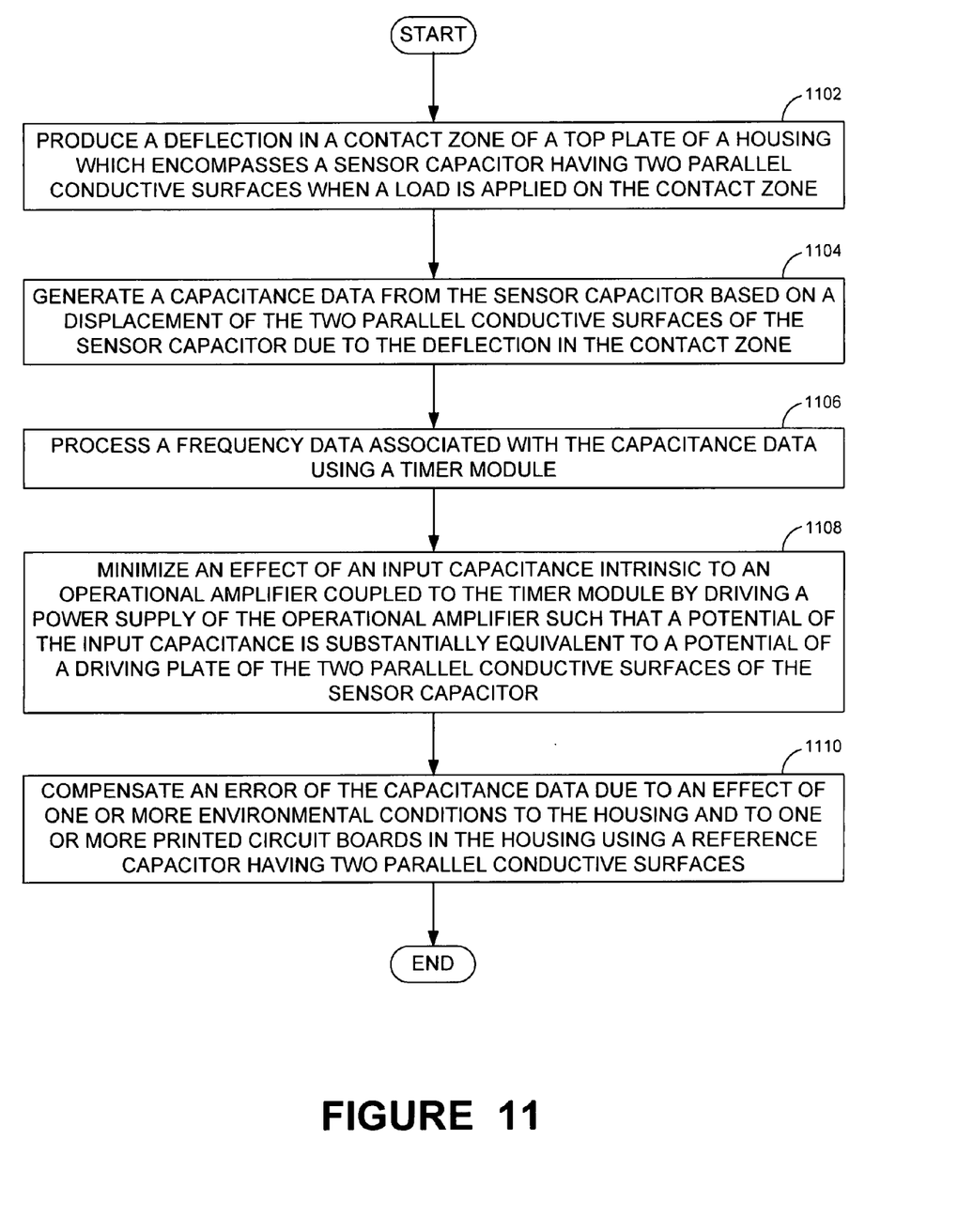
FIG. 11 is a process flow of minimizing an effect of an input capacitance intrinsic to an operational amplifier coupled to a timer module of the capacitive force-measuring device of FIG. 1, according to one embodiment.

FIG. 11 is a process flow of minimizing an effect of an input capacitance intrinsic to an operational amplifier coupled to a timer module of the capacitive force-measuring device 100 of FIG. 1, according to one embodiment. In operation 1102, a deflection in a contact zone (e.g., the contact zone 214 of FIG. 2) of a top plate (e.g., the top plate 202) of a housing (e.g., the housing 102 and/or the housing 152 of FIG. 1) which encompasses a sensor capacitor (e.g., the sensor capacitor 1008 of FIG. 10) having two parallel conductive surfaces may be produced when a load (e.g., the force 212) is applied on the contact zone. In operation 1104, a capacitance data (e.g., the change in capacitance 810) may be generated from the sensor capacitor based on a displacement of the two parallel conductive surfaces (e.g., the change in the overlap area 806 and/or the change in distance 808) of the sensor capacitor due to the deflection in the contact zone.

In operation 1106, a frequency data (e.g., the change in frequency 814) associated with the capacitance data may be processed using the timer module. In operation 1108, an effect of an input capacitance intrinsic to an operational amplifier coupled to the timer module may be minimized by driving a power supply of the operational amplifier such that a potential of the input capacitance is substantially equivalent to a potential of a driving plate (e.g., the lower sensor surface 402) of the two parallel conductive surfaces of the sensor capacitor. In operation 1110, an error of the capacitance data due to an effect of one or more environmental conditions to the housing and/or to one or more printed circuit boards in the housing may be compensated using a reference capacitor (e.g., the reference capacitor 1014 of FIG. 10) having two parallel conductive surfaces.

Although the present embodiments have been described with reference to specific example embodiments, it will be evident that various modifications and changes may be made to these embodiments without departing from the broader spirit and scope of the various embodiments. For example, the various devices, modules, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the processor module 816, the digitizer module 818, the compensation module 820, the communication module 822, the wired communication module 824 and/or the wireless communication module 826 of FIG. 8 may be enabled using software and/or using transistors, logic gates, and electrical circuits (e.g., application specific integrated ASIC circuitry) such as a processor circuit, a digitizer circuit, a compensation circuit, a communication circuit, a wired communication circuit, and/or a wireless communication circuit. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An apparatus, comprising:
a sensor capacitor based on at least one pair of parallel conductor surfaces;
a housing to encompass the sensor capacitor, wherein the housing is composed of a low creep material which includes at least one of a 17-4 PH stainless steel, a 15-5 PH stainless steel, and a maraging stainless steel;
a digitizer module in the housing to generate a digital measurement based on a change in a capacitance of the sensor capacitor when a contact zone of the housing is deflected by a force applied on the contact zone;
a compensation module of the digitizer module to apply another digital measurement of at least one distortion factor to the digital measurement to minimize an effect of the at least one distortion factor to the apparatus; and
a communication module to communicate at least one of an analog signal and a digital signal through at least one of a wired channel and a wireless channel, wherein the at least one of the analog signal and the digital signal to include at least the change in the capacitance.

2. The apparatus of claim 1, further comprising a reference capacitor having an upper reference surface and a lower reference surface in the housing to compensate an error in the digital measurement based on at least one environmental condition.

3. The apparatus of claim 1, wherein the change in the capacitance of the sensor capacitor is based on a displacement of a distance between an upper sensor surface of the sensor capacitor and a lower sensor surface parallel to the upper sensor surface.

4. The apparatus of claim 1, wherein the change in the capacitance of the sensor capacitor is based on a displacement of an overlap area between an inner conductive area and an outer conductive area parallel to the inner conductive area.

5. The apparatus of claim 1, wherein the change in the capacitance of the sensor capacitor is based on both a displacement of a distance between an upper sensor surface of the sensor capacitor and a lower sensor surface parallel to the upper sensor surface and a displacement of an overlap area between an inner conductive area and an outer conductive area parallel to the inner conductive area.

6. The apparatus of claim 1, further comprising a processor module having a central procession unit (CPU) to execute a set of instructions associated with at least the digitizer module, the compensation module, and the communication module.

7. The apparatus of claim 1, further comprising a wireless communication module of the communication module to wirelessly communicate with an external device based on at least one of a wireless universal serial bus (USB), a Wi-Fi, a Bluetooth, and a Zigbee.

8. The apparatus of claim 1, further comprising a wired communication module of the communication module to communicate with an external device, wherein the at least one of the analog signal and the digital signal to include at least one of a universal serial bus (USB) signal, a voltage signal, a frequency signal, and a current signal.

9. The apparatus of claim 1, further comprising a tilt adaptor surface surrounding the lower sensor surface to minimize the another digital measurement of the at least one distortion factor associated with a tilting effect of the force applied on the contact zone.

10. The apparatus of claim 1, wherein the housing is composed of a low creep material which includes at least one of a 17-4 PH stainless steel, a 15-5 PH stainless steel, and a maraging stainless steel, and wherein at least one printed circuit board in the housing is composed of a plurality of materials including at least one of a flame resistant 4 (FR4), a ceramic, and a glass.

11. The apparatus of claim 1, further comprising a sensor module in the housing to measure a plurality of environmental conditions of the apparatus, wherein the plurality of environmental conditions to include at least one of a temperature, a pressure, a radiation, a humidity, a vibration, and a motion.

12. The apparatus of claim 11, wherein the another digital measurement of the at least one distortion factor is based on at least one of the plurality of environmental conditions.

13. The apparatus of claim 1, further comprising an alarm module associated with the sensor capacitor to generate a sensory data when a parameter of the digital measurement exceeds a threshold value.

14. The apparatus of claim 1, further comprising a capacitance-to-frequency converter module to generate a frequency value based on the change in the capacitance of the sensor capacitor, wherein the frequency value is processed by the digitizer module.

15. The apparatus of claim 1, further comprising a groove surrounding the contact zone to perform at least one of substantially confining a deflection of the contact zone in the groove and adjusting a degree of the deflection of the contact zone.

16. The apparatus of claim 1, further comprising at least one of an upper mounting structure and a lower mounting structure to fasten the housing to an external structure, wherein the at least one of the upper mounting structure and the lower mounting structure to include at least a threaded stud.

* * * * *